UNITED STATES PATENT OFFICE.

CARL SHELLEY MINER, OF CHICAGO, ILLINOIS, ASSIGNOR TO ALLWOOD LIME COMPANY, OF ALLWOOD SIDING, WISCONSIN, A CORPORATION OF WISCONSIN.

DISINFECTANT.

1,167,360.      Specification of Letters Patent.      Patented Jan. 4, 1916.

No Drawing.      Application filed November 26, 1913. Serial No. 803,304.

*To all whom it may concern:*

Be it known that I, CARL S. MINER, a citizen of the United States, residing at Chicago, in the county of Cook and State of Illinois, have invented certain new and useful Improvements in Disinfectants, of which the following is a specification.

This invention relates to disinfectants and has for one of its objects to provide an inexpensive and effective composition which is suitable for use as a disinfectant, deodorizer and germicide.

At present only the large solid lumps of quicklime, which are obtained by heating limestone in a suitable kiln, are marketed. The screenings which are of an equally high grade lime are usually largely loss as only a small percentage can be used for building purposes before slaking. By using these screenings I am able to prepare a very efficient disinfectant at a low cost.

To prepare the disinfectant I proceed as follows: The screenings of a high grade dolomitic lime are crushed or pulverized in a suitable machine. The pulverized lime is then intimately mixed with pulverized potassium permanganate crystals. The proportions of the ingredients may fall within wide limits but the most economical and effective, and the preferred formula, is a mixture of two per cent. of potassium permanganate and ninety-eight per cent. of lime.

The disinfectant is in the form of a dry powder and may be packaged for distribution.

In use the disinfectant may be sprinkled in such places as desired. In damp places or in the presence of moisture, the constituents of the mixture, will react one on the other and there will be present lime, potassium permanganate, as well as potassium hydroxid and calcium permanganate, the latter two being formed in the reaction of the former two and water. The permanganates in the presence of lime have a much more vigorous oxidizing action than when used alone and investigation indicates that the calcium permanganate formed is itself an oxidizing agent of a very powerful nature.

The disinfectant is inexpensive and will have no harmful effect on persons or animals and, consequently, is suitable for use in any damp, malodorous or germ-infected place, such as, about stables, in cellers, etc.

Having thus described my invention what is claimed as new is:

A disinfecting composition comprising calcium oxid and potassium permanganate in substantially the proportions of two per cent. of potassium permanganate and ninety-eight per cent. of calcium oxid, said composition being in the form of a dry powder and capable, in the presence of moisture, of reacting between the constituents to liberate free oxygen, with the production of calcium manganate and potassium hydroxid.

In testimony whereof I affix my signature in presence of two witnesses.

CARL SHELLEY MINER.

Witnesses:
M. E. SQUIRE,
J. D. CARPENTER.

Copies of this patent may be obtained for five cents each, by addressing the "Commissioner of Patents, Washington, D. C."